US011472744B2

(12) United States Patent
Allemand et al.

(10) Patent No.: US 11,472,744 B2
(45) Date of Patent: Oct. 18, 2022

(54) METHOD FOR PREPARING COMPOSITE MATERIALS WITH AN OXIDE MATRIX AND OXIDE REINFORCEMENTS BY MEANS OF A CALEFACTION PROCESS

(71) Applicants: COMMISSARIAT A L'ENERGIE ATOMIQUE ET AUX ENERGIES ALTERNATIVES, Paris (FR); CENTRE NATIONAL DE LA RECHERCHE SCIENTIFIQUE, Paris (FR); UNIVERSITE DE BORDEAUX, Bordeaux (FR)

(72) Inventors: Alexandre Allemand, Bordeaux (FR); Patrick David, Saint-Cyr-sur-Loire (FR); Pierre Broisson, Chancenay (FR); Clémence Besnard, Yerres (FR); Laurence Maille, Pessac (FR)

(73) Assignees: COMMISSARIAT A L'ENERGIE ATOMIQUE ET AUX ENERGIES ALTERNATIVES, Paris (FR); CENTRE NATIONAL DE LA RECHERCHE SCIENTIFIQUE, Paris (FR); UNIVERSITE DE BORDEAUX, Bordeaux (FR)

( * ) Notice: Subject to any disclaimer, the term of this patent is extended or adjusted under 35 U.S.C. 154(b) by 0 days.

(21) Appl. No.: 16/487,691

(22) PCT Filed: Feb. 21, 2018

(86) PCT No.: PCT/FR2018/050404
§ 371 (c)(1),
(2) Date: Aug. 21, 2019

(87) PCT Pub. No.: WO2018/154232
PCT Pub. Date: Aug. 30, 2018

(65) Prior Publication Data
US 2020/0377418 A1 Dec. 3, 2020

(30) Foreign Application Priority Data

Feb. 23, 2017 (FR) .......................... 1751427

(51) Int. Cl.
*C04B 35/80* (2006.01)
*C04B 35/14* (2006.01)
(Continued)

(52) U.S. Cl.
CPC ............ *C04B 35/117* (2013.01); *C04B 35/14* (2013.01); *C04B 35/18* (2013.01); *C04B 35/185* (2013.01);
(Continued)

(58) Field of Classification Search
CPC ....... C04B 35/80; C04B 35/117; C04B 35/14; C04B 35/185; C04B 35/488;
(Continued)

(56) References Cited

U.S. PATENT DOCUMENTS 4,472,454 A    9/1984  Houdayer et al.
7,714,155 B2 * 5/2010  Sato ................... H01L 21/02216
                                                          556/56
(Continued)

FOREIGN PATENT DOCUMENTS

EH    2 045 225 A2    4/2009
EP    0 081 409 A1    6/1983
(Continued)

OTHER PUBLICATIONS

"Calefaction." Academic Press Dictionary of Science and Technology, edited by Christopher G. Morris, Elsevier Science & Technology, 4th edition, 1992. Credo Reference, https://search.credoreference.com/content/entry/apdst/calefaction/0?institutionId=743. Accessed Oct. 29, 2020. (Year: 1992).*

(Continued)

*Primary Examiner* — Karl E Group
*Assistant Examiner* — Cameron K Miller (74) *Attorney, Agent, or Firm* — Oblon, McClelland, Maier & Neustadt, L.L.P.

(57) ABSTRACT

Method for the preparation, by means of a heating technique, of a composite material composed of a matrix of at least a first oxide of at least one metal and/or at least one metalloid reinforced by reinforcements in at least a second oxide of at least one metal and/or at least one metalloid, characterised in that the following successive steps are carried out: the reinforcements are placed in at least one liquid precursor of the first oxide of at least one metal and/or at least one metalloid; said reinforcements and the liquid precursor are heated so as to form the first oxide by means of the thermal decomposition of said liquid precursor, and to deposit the first oxide thus formed around the reinforcements and between the reinforcements thus forming the matrix.

15 Claims, 7 Drawing Sheets

(51) Int. Cl.
| | | |
|---|---|---|
| *C04B 35/185* | (2006.01) | |
| *C04B 35/117* | (2006.01) | |
| *C04B 35/488* | (2006.01) | |
| *C04B 35/632* | (2006.01) | |
| *C04B 35/18* | (2006.01) | |
| *C04B 35/46* | (2006.01) | |

(52) U.S. Cl.
CPC ............ *C04B 35/46* (2013.01); *C04B 35/488* (2013.01); *C04B 35/6325* (2013.01); *C04B 35/80* (2013.01); *C04B 2235/3217* (2013.01); *C04B 2235/3232* (2013.01); *C04B 2235/3244* (2013.01); *C04B 2235/3418* (2013.01); *C04B 2235/3463* (2013.01); *C04B 2235/483* (2013.01); *C04B 2235/5224* (2013.01); *C04B 2235/5228* (2013.01); *C04B 2235/614* (2013.01); *C04B 2235/616* (2013.01)

(58) Field of Classification Search
CPC ........ C04B 35/6325; C04B 2235/3217; C04B 2235/3232; C04B 2235/3244; C04B 2235/3418; C04B 2235/3463; C04B 2235/483; C04B 2235/5224; C04B 2235/5228; C04B 2235/614; C04B 2235/616

See application file for complete search history.

(56) References Cited

U.S. PATENT DOCUMENTS

| | | | |
|---|---|---|---|
| 2004/0038029 A1* | 2/2004 | Zinn | .................. C04B 35/80 |
| | | | 428/375 |
| 2009/0087588 A1 | 4/2009 | Fillion | |
| 2010/0261058 A1* | 10/2010 | Lopatin | ................. H01M 4/626 |
| | | | 429/212 |

FOREIGN PATENT DOCUMENTS

| | | |
|---|---|---|
| FR | 2 712 884 A1 | 6/1995 |
| WO | WO 99/40043 A1 | 8/1999 |

OTHER PUBLICATIONS

International Search Report dated Jun. 5, 2018 in PCT/FR2018/050404 filed on Feb. 21, 2018.

French Preliminary Search Report dated Jan. 5, 2018 in French Application 1751427 filed on Feb. 23, 2017.

David, P. G. et al., "Rapid Densification of Carbon and Ceramic Matrix Composites Materials by Film Boiling Process," 16th International Conference on Composite Materials, 2007, pp. 1-5, XP055437935.

Rovillain, D. et al., "Film boiling chemical vapor infiltration—An experimental study on carbon/carbon composite materials," Carbon, vol. 39, 2001, pp. 1355-1365, XP004319979.

Nadeau, N. et al., "Analytical and numerical study of the densification of carbon/carbon composites by a film-boiling chemical vapor infiltration process," Chemical Engineering Science, vol. 61, 2006, pp. 7509-7527, XP005840647.

* cited by examiner

METHOD FOR PREPARING COMPOSITE MATERIALS WITH AN OXIDE MATRIX AND OXIDE REINFORCEMENTS BY MEANS OF A CALEFACTION PROCESS

TECHNICAL FIELD

The invention relates to a method for preparing composite materials with an oxide matrix and oxide reinforcements also called oxide/oxide composite materials. According to the invention, said composite materials are prepared by a process, method, technique known as calefaction process, technique. The calefaction process is a well-known process, which is also called "Film boiling Chemical Vapour Infiltration" or "Film boiling CVI" process, or even "Kalamazoo" process.

More specifically, the invention relates to a method for preparing, by a calefaction technique, process, a composite material consisting of a matrix made of at least one first oxide of metal or of metalloid reinforced by reinforcements made of at least one second oxide of metal or of metalloid.

The technical field of the invention may be defined as that of oxide/oxide composite materials that comprise an oxide matrix and oxide reinforcements.

STATE OF THE PRIOR ART

The very large majority of oxide/oxide composite materials is produced by a powder sintering technique, for example by a "Hot pressing" or "HP" technique, implementing the technique known as "pre-preg" technique.

Another approach consists of developing said oxide/oxide composite materials by means of the "Chemical Vapour Infiltration" or "CVI" technique.

In said "CVI" technique, a gaseous precursor will, on contact with a substrate, react in order to form a solid phase.

Possible chemical reactions may be decomposition, reduction, hydrolysis or even oxidation. The formation of a deposit is determined by the thermal activation of the substrate used. The gas that circulates in the CVI furnace consists of a precursor and a carrier gas that dilutes said precursor. In addition, said CVI technique, operates in most cases at reduced pressure in order to limit the appearance of interfering convection currents, which makes it possible to obtain a homogeneous deposit.

However, the implementation of said CVI technique is very cumbersome.

Furthermore, in the CVI technique, in general, the fact of working with a diluted gas and at low pressure means that the deposition kinetics is very slow, which makes said technique very expensive. For some parts, the total duration of densification may be several weeks.

However, currently, the CVI technique, is, with the "hot pressing" or "HP" technique, implementing the technique known as "pre-preg" technique, the technology the most used in order to densify parts for high-tech sectors such as defence or aviation.

Nevertheless, the slowness of the CVI technique, when it is applied to the preparation of oxide/oxide composite materials, makes same almost unusable. Furthermore, the CVI technique is complex due to the nature of the toxic gaseous precursors that same uses.

Finally, the only technique that makes it possible to prepare oxide/oxide composite materials rapidly is the "Spark Plasma Sintering" or "SPS" technique that is also known under the name of "Field Activated Sintering Technique" or "FAST" technique, or even under the name of flash sintering. But, this technique remains marginal and is only used on the laboratory scale. In addition, this technique is hardly compatible with the use of a three-dimensional preform.

Therefore, with regard to the preceding, there is a need for a method for preparing an oxide/oxide composite material that does not have the drawbacks, defects and disadvantages of the methods for preparing oxide/oxide composite materials of the prior art, and which solves the problems of the methods for preparing oxide/oxide composite materials of the prior art.

In particular, there is a need for a method for preparing an oxide/oxide composite material the kinetics of which is rapid and in any case, more rapid than the kinetics of the chemical vapour infiltration process. There is also a need for a method for preparing an oxide/oxide composite material that is simple, reliable, easy to implement, and of a reduced cost.

DESCRIPTION OF THE INVENTION

Said goal, and others, are achieved in accordance with the invention by a method for preparing, by still a calefaction technique, a composite material consisting of a matrix made of at least one first oxide of at least one metal and/or at least one metalloid reinforced by reinforcements made of at least one second oxide of at least one metal and/or at least one metalloid, characterised in that the following successive steps are carried out:

the reinforcements are disposed in at least one liquid precursor of the first oxide of at least one metal and/or at least one metalloid;

said reinforcements and the liquid precursor are heated, so as to form the first oxide by means of thermal decomposition of said liquid precursor, and to deposit the first oxide thus formed around the reinforcements and between the reinforcements thus forming the matrix.

By liquid precursor, it is understood that the precursor is liquid at ambient temperature, generally of 20° C. to 25° C., and at atmospheric pressure.

The method according to the invention may be defined as a method for preparing a composite material consisting of a matrix made of at least one first oxide of at least one metal and/or at least one metalloid reinforced by reinforcements made of at least one second oxide of at least one metal and/or at least one metalloid, or more simply an oxide/oxide composite material by a calefaction technique, method.

The method according to the invention differs fundamentally from the methods for preparing oxide/oxide composite materials of the prior art in that it implements an extremely specific technique, i.e. the calefaction technique.

The use of a calefaction process, technique also called "Film boiling Chemical Vapour Infiltration" or "Film boiling CVI" process or even "Kalamazoo" process for preparing oxide/oxide composite materials is neither described nor suggested in prior art.

No document exists mentioning or suggesting using the calefaction technique for preparing oxide single-phase materials, and oxides/oxides composite materials.

Indeed, first of all, it was seen above that the techniques currently used for preparing oxide/oxide composite materials were the powder sintering techniques, for example the said "pre-preg" technique and the "Chemical Vapour Infiltration" or "CVI" technique.

Next, the calefaction technique, although same is well known and used notably for the development of C/C, C/SiC or even SiC/SiC composites, has never been implemented, for the development of oxide/oxide composites.

The method of densification by calefaction was notably described in document [1], published in 1982. Said document describes a method for densifying a porous structure, for example made of carbon or of graphite, wherein the porous structure is immersed in a precursor that is a liquid hydrocarbon, such as cyclohexane, the whole is heated by induction, for example at a temperature of 1000° C. to 1300° C., so as to form, by decomposition of the hydrocarbon, carbon or pyrolytic graphite that is deposited within the pores of the porous structure.

A cooling circuit makes it possible to condense the hydrocarbon not used and to recover same in order to limit the losses in precursor.

The densification is performed in the hottest area, at the core of the structure. A densification front progresses to the outside of the preform as said preform is densified. Said front is due to a significant thermal gradient, several hundreds degrees per millimetres between the portion close to the susceptor and the portion close to the liquid.

In the calefaction technique, as opposed to what occurred in the "Chemical Vapour Infiltration" or "CVI" technique, the environment close to the substrate is forced to be saturated in vapour due to the Leidenfrost effect.

In addition, the liquid being constantly boiling, the turbulences around the hot structure provide a constant flow of reagents as well as a continuous renewal of the vapour phase. Thus, the densification duration is considerably reduced compared to the CVI technique, by a factor 50 to 100.

Following the description thereof in document [1], the technique of densification by calefaction was only developed and industrialised for densifying carbon parts or preforms with carbon, carbides, and possibly nitrides.

Thus, document [2] describes a method for densifying a porous preform comprising:
  immersing the porous preform in a precursor liquid which is heat-decomposable;
  heating the porous preform in the precursor liquid at a temperature sufficient to decompose the liquid precursor and to deposit a first decomposition product of the liquid precursor within the preform;
  ceasing heating the preform in the precursor liquid before the surface of the preform is densified, thereby forming a partially densified preform;
  completing densification by chemical vapour deposition in an atmosphere comprising a gaseous precursor that decomposes in to a second decomposition product within the undensified portions of the preform.

According to a first embodiment, the first decomposition product may comprise carbon, and then the liquid precursor comprises a hydrocarbon such as cyclohexane.

Or, the first decomposition product comprises silicon carbide and the liquid precursor comprises an organosilane such as methyltrichlorosilane (MTS).

The first decomposition product may also be silicon nitride.

The preform is notably made of non-woven carbon fibres.

Thus, said document exclusively relates to the development of a composite material comprising a matrix made of carbon, silicon carbide, or silicon nitride, and reinforcements made of carbon fibres.

There is no mention or suggestion in said document of the preparation of oxide/oxide composite materials.

Document [3] describes a method for densifying a porous structure, notably made of carbon, graphite, alumina or boron nitride, by boron nitride. For this, the porous structure is placed in a precursor chosen from the borazines, and the whole is heated by induction, under a pressure of at least 1.2 $10^5$ Pa so as, to form, by decomposition of the precursor, boron nitride that is deposited within the pores of the porous structure.

The porous structure may be made of carbon, alumina graphite, or boron nitride.

Thus, said document [3] exclusively relates to the development of a composite material comprising a matrix made of boron nitride and reinforcements made of carbon, alumina graphite, or boron nitride.

There is no mention or suggestion in said document of the preparation of oxide/oxide composite materials, that is to say of materials of which the matrix as well as the reinforcements are both made of oxides. Indeed, even if the porous structure may possibly be made of alumina, said structure is densified by BN and not by an oxide, and the material thus obtained is therefore not an oxide/oxide composite.

The calefaction process is currently applied notably to the densification of fabrics or felts that may be used for producing aircraft brake disks or other parts used in aeronautics. Indeed, the parts produced are excellent thermal insulators and have a high resistance to impacts and to abrasion.

It has been highlighted, according to the invention, surprisingly that the calefaction technique could indeed be applied to the densification of porous structures made of oxide of metal or of metalloid by another oxide, in other words that the calefaction technique could be applied to the preparation of oxide/oxide composite materials, more specifically of composite materials comprising a matrix made of oxide of metal or of metalloid and preforms also made of oxide of metal or of metalloid.

The examples given below show that the method according to the invention was indeed implemented successfully for preparing oxide/oxide composite materials, such as composite materials the matrix of which consists of $SiO_2$ or $Al_2O_3$ with $Al_2O_3$ or mullite fibrous reinforcements.

The method according to the invention has all the advantages of the calefaction technique that have already been described above notably in terms of rapidity of the method.

The method according to the invention overcomes all the drawbacks of the methods for preparing oxide/oxide composite materials of the prior art that do not implement a calefaction technique but implement powder sintering techniques, for example the said "pre-preg" technique, and the "Chemical Vapour Infiltration" or "CVI" technique.

The method according to the invention provides a solution to the methods of the prior art for preparing oxide/oxide composite materials and has a number of advantages over said methods notably over the methods implementing a CVI technique.

Thus, the duration of the method according to the invention is considerably reduced compared to a method implementing the CVI technique, for example by a factor 50 to 100.

By way of example, the total duration of the method according to the invention is of 20 to 60 minutes, whereas the total duration of a method implementing the CVI technique for preparing the same oxide/oxide composite material is of 3 hours to 48 hours.

Another advantage of the method according to the invention is that it is implemented at atmospheric pressure, and not under a reduced pressure as the methods implementing the CVI technique, which greatly simplifies the device for implementing the method according to the invention and reduces the cost thereof.

The materials prepared by the method according to the invention have excellent thermal and mechanical properties, at least equivalent to those of the materials prepared by the methods of the prior art, such as the methods that implement the CVI technique.

In particular, the oxide/oxide composite materials prepared by the method according to the invention are excellent thermal insulators and have a good resistance to oxidation and good physical and mechanical properties.

Advantageously, the first oxide of at least one metal and/or at least one metalloid may be chosen from $SiO_2$, $Al_2O_3$, $ZrO_2$, $TiO_2$, mullite, i.e. the defined compound of formula $3Al_2O_3, 2SiO_2$, aluminosilicates, for example barium aluminosilicate (BAS), and the mixtures thereof.

Advantageously, the second oxide of at least one metal and/or at least one metalloid may be chosen from silica, alumina, mullite, i.e. the defined compound of formula $3Al_2O_3, 2SiO_2$, and the mixtures thereof.

The first oxide of at least one metal and/or at least one metalloid and the second oxide of at least one metal and/or at least one metalloid may be identical or different.

For example, the first oxide of at least one metal and/or at least one metalloid and the second oxide of at least one metal and/or at least one metalloid may be both alumina. The composite material prepared is therefore then an alumina/alumina composite material.

Advantageously, the reinforcements may be fibres.

The fibres may form threads, fabrics, felts or three-dimensional structures with long fibres.

Advantageously, the liquid precursor has a boiling temperature of less than 300° C., preferably of less than 250° C., again preferably of less than 200° C.

Advantageously, the liquid precursor may be chosen from all of the liquid precursors used in the chemical vapour deposition (CVD) technique or in the sol-gel technique. Due to the fundamental differences that exist between the CVD technique or the sol-gel technique and the calefaction technique, it is surprising that the precursors used in the chemical vapour deposition (CVD) technique or in the sol-gel technique can be used successfully in the calefaction technique to form an oxide matrix.

Advantageously, the liquid precursor may be chosen from the organometallic compounds and the organometalloid compounds.

Advantageously, the organometallic compounds may be chosen from the alkoxides/alcoholates of metals, and the organometalloid compounds may be chosen from the alkoxides/alcoholates of metalloids.

Advantageously, the organometallic compounds may be chosen from the organometallic compounds comprising a metal chosen from zirconium, aluminium, titanium, cerium, yttrium, lanthanum, lead, tin, antimony, boron, vanadium, indium, niobium, bismuth and hafnium.

Preferably, the organometallic compounds may be chosen from the trialkoxy aluminiums such as aluminium tri-sec-butoxide (also called aluminium butoxide); aluminium acetylacetonate; the tetra alkoxy zirconiums such as zirconium tert-butoxide, tetra-n-propoxy zirconium ("TPOZ") or tetra-i-propoxy-zirconium; and the tetra alkoxy titaniums such as tetra isopropoxy titanium.

Advantageously, the organometalloid compounds may be chosen from the organosilanes.

Preferably, the organometalloid compounds may be chosen from the tetra alkoxy silanes such as tetraethyl orthosilicate (TEOS), or tetramethyl orthosilicate (TMOS); methyltrichlorosilane (MTS), dimethyldichlorosilane, and methyldichlorosilane.

Herein, the alkoxy groups may be linear or branched, and comprise 1 to 10 carbon atoms, preferably 1 to 6 C, more preferably 1 to 4 C. Advantageously, the reinforcements and the liquid precursor may be heated to a temperature of 700° C. to 1200° C., preferably to a temperature of 800° C. to 1100° C., for a period of 5 to 120 minutes, preferably of 15 to 60 minutes. The ranges of temperature and duration specified above, and a fortiori the preferred ranges of temperature and duration mentioned above, make it possible to obtain better results, i.e. a dense, homogeneous matrix, without cracks and without carbon.

The reinforcements and the liquid precursor may be heated by inductive heating or by resistive heating.

Other features and advantages of the invention will become clearer upon reading the following detailed description of specific embodiments of the invention, notably in the form of examples.

This description is given by way of illustrative and non-limiting example and is made in relation to the appended drawings.

BRIEF DESCRIPTION OF THE DRAWINGS

The scale shown in FIG. 2 represents 100 µm.

The scale shown in FIG. 3 represents 300 µm.

The scale shown in FIG. 4 represents 100 µm.

The scale shown in FIG. 5 represents 30 µm.

The scale shown in FIG. 6 represents 50 µm.

The scale shown in FIG. 7 represents 30 µm.

The scale shown in FIG. 8 represents 300 µm.

The scale shown in FIG. 9 represents 50 µm.

The scale shown in FIG. 10 represents 200 µm.

The scale shown in FIG. 11 represents 30 µm.

The scale shown in FIG. 12 represents 50 µm.

The scale shown in FIG. 13 represents 30 µm.

DETAILED DESCRIPTION OF SPECIFIC EMBODIMENTS

According to the invention, reinforcements of any form, shape, are placed in at least one liquid precursor of the first oxide of at least one metal and/or at least one metalloid, then the whole is heated, that is to say the reinforcements and the liquid precursor, so as to form the first oxide by means of thermal decomposition of said liquid precursor, and to deposit the first oxide thus formed around the reinforcements thus forming the matrix.

By "placed in at least one liquid precursor", it is generally understood that the reinforcements are entirely immersed, drowned in a volume of the liquid precursor.

The first oxide of at least one metal and/or at least one metalloid and the second oxide of at least one metal and/or at least one metalloid may be chosen from the compounds mentioned above.

Generally, the reinforcements are fibres, and said fibres may form threads, fabrics, felts or three-dimensional structures with long fibres, or any other structure.

According to the invention, it was shown that some liquid precursors may, surprisingly, when same were used in the calefaction technique, form oxide matrices by means of thermal decomposition. The preferred matrices are the matrices made of $SiO_2$, $ZrO_2$, $TiO_2$ or $Al_2O_3$.

Figure 1:
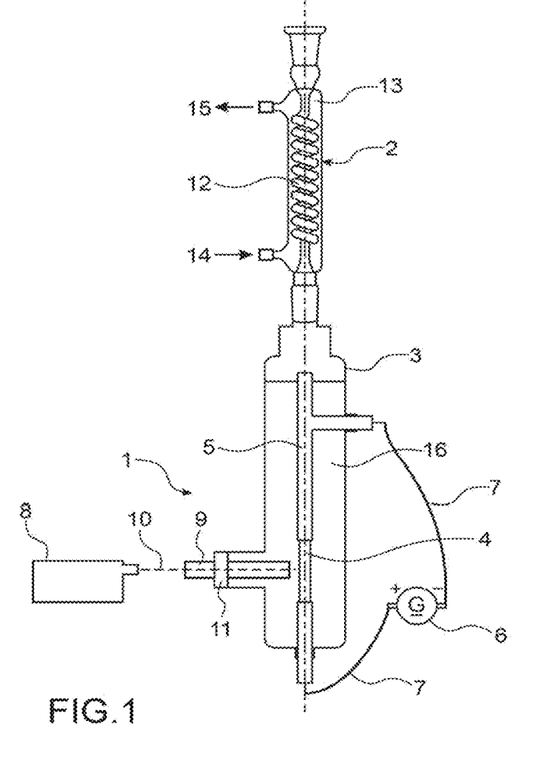
FIG. 1 is a schematic vertical cross-sectional view of a calefaction densification reactor, known as "Kalamazoo" reactor that may be used to implement the method according to the invention, and that is used in the examples.

Said precursors, in order to be used in the calefaction technique and in the device for implementing said technique such as the device shown in FIG. 1 must imperatively be liquid at ambient temperature.

Preferably, said liquid precursors have a boiling temperature less than 300° C., preferably less than 250° C., more preferably less than 200° C. Indeed, such a boiling temperature, less than 300° C., makes it possible to optimise the decomposition of the precursor.

Suitable precursors have already been cited above.

The organometallics or organosilanes, more specifically the alkoxides/alcoholates of metals or of silicon are the preferred liquid precursors for obtaining oxide deposits by means of a calefaction technique.

Examples of said preferred liquid precursors are shown in Table I below.

The liquid precursors mentioned in Table I are molecules used in soft chemistry in order to obtain by sol/gel the sought oxides by polymerisation and polycondensation. It was highlighted, surprisingly, according to the invention that said molecules used in the sol-gel technique could play the role of liquid precursor in the calefaction technique.

TABLE I

| Sought matrix | Precursor | Melting temperature | Boiling temperature | Majority cracking products |
|---|---|---|---|---|
| $SiO_2$ | Tetraethyl orthosilicate | −82.49° C. | 168° C. | $SiO_2$, ethanol, ethylene, ethanal |
| $ZrO_2$ | Zirconium tert-butoxide | <25° C. | 81° C. at 3 torr | $ZrO_2$, isobutane, isobutene, 2-methylpropane-2-ol |
| $TiO_2$ | Tetra-isopropoxy titanium | 14° C. | 232° C. | $TiO_2$, propene, propane, isopropanol |
| $Al_2O_3$ | Aluminium tri-sec-butoxide | <25° C. | 206° C. at 30 torr | $Al_2O_3$, 2-butanol, 2-butene |

Other liquid precursors may also be used, this is for example tetramethyl orthosilicate (TMOS) and aluminium acetylacetonate.

In the following examples, tetraethyl orthosilicate (TEOS) and aluminium tri-sec-butoxide (aluminium butoxide) are used in a calefaction reactor in order to produce deposits of silica or of alumina on flat or fibrous structures, thus showing that the method according to the invention was indeed implemented successfully.

The reinforcements and the liquid precursor may be heated at a temperature of 700° C. to 1200° C., preferably at a temperature of 800° C. to 1100° C., for a period of 5 to 120 minutes, preferably of 15 to 60 minutes.

FIG. 1 illustrates a device that could to be used for implementing the method according to the invention.

Said device essentially comprises two portions, i.e. a reactor or chamber 1, and a condenser, cooler, or heat exchanger 2.

The wall 3 of the reactor is made of a material compatible with the liquid precursor used and that withstands the temperatures used in the method. Such a material is for example borosilicate.

The substrate, consisting of the reinforcements, on which the oxide deposit is performed, is placed, disposed, supported by a structure or part 4 that has for example the shape of a cylinder or mandrel.

Said structure or part 4 that supports the substrate, consisting of the reinforcements, must imperatively be made of an electrically-conductive material, such as carbon graphite. Said part 4, notably made of carbon graphite, is called support or susceptor.

A sample holder 5 made of an electrically-conductive material for example made of brass, thus forming electrodes, makes it possible to hang the structure or part 4 that supports the substrate consisting of the reinforcements on which the oxide deposit is performed.

The heating of the reactor 1 is resistive heating.

In order to produce said resistive heating, the sample holder 5 and therefore the structure or part 4 that supports the substrate are connected to a power supply, or generator 6 by means of wires 7, and the structure or part 4 that supports the substrate, is therefore heated by Joule effect.

The temperature of the substrate may be measured by an infrared radiation pyrometer 8 provided with a pyrometer sight 9, which detects without contact the rays 10 emanating from the heat source consisting of the heated substrate and that have passed through the wall 3 of the reactor at a transparent window 11.

The pyrometer 8 may be connected to a programmer for regulating the power of the power supply in order to control the temperature of the substrate.

The reactor 1 may comprise a conduit (not shown) for the continuous introduction of the liquid precursor into the reactor 1 and an opening provided with a valve located in the lower portion of the reactor and allowing draining of said reactor.

The reactor 1 is surmounted by the condenser, cooler, or heat exchanger 2.

The condenser 2, includes a coil 12, which receives the vapours, essentially containing the vapours of the precursor, from the calefaction reaction.

A coolant such as water, ethylene glycol or other circulates in a sleeve 13 surrounding the coil between a supply or input of coolant 14 and output or removal of coolant 15.

In the condenser 2, the vapours, from the calefaction reaction, are cooled and it is made sure that the cooling temperature is such that, essentially, only the vapours of the precursor are condensed. The liquid precursor thus recovered is then sent back into the reactor 1.

Hereafter is described the operating sequence for preparing an oxide/oxide composite material according to the invention.

Operating sequence:

The substrate consisting of the reinforcements is disposed on the support 4 inside the reactor 1, then, possibly, sweeping of the reactor 1 is performed using an inert gas, in order to flush out the oxygen possibly present inside the reactor.

The reactor is then filled with the liquid precursor 16.

After having put into operation the cooling circuit 12, 14, 15 and the power supply 6, the programmer, and the pyrometer 8, the rise in temperature of the substrate is started. Subsequently, the power of the heating is increased up to boiling and reflux of the precursor 16. Said precursor, in liquid form, penetrates, infiltrates, into the voids, for example into the pores of the substrate.

When the thermal decomposition or "cracking" temperature is reached (800° C. for example, for TEOS), the precursor 16 vapours are subjected to thermal decomposition or "cracking" in the substrate, which leads to the formation of the oxide and to the deposit of same within the voids, for example within the pores of the substrate, between the reinforcements, and on the reinforcements, around the reinforcements that constitute the substrate. Thus, an oxide matrix is formed. Reference can also be made to densification of the substrate. More specifically, the thermal decomposition or "cracking" is carried out at the hottest portions of the substrate.

The densification front propagates from the portion of the substrate in contact with the support 4 towards the portion of the substrate remote from the support.

For example, in the case of a substrate placed on a cylinder-shaped support 4, said substrate therefore comprising an inner wall in contact with the support 4 and an outer wall remote from the support, the densification front advances from the inner wall towards the outer wall.

The densification front propagates into the substrate during the method at a speed that may vary between a few tens of millimetres per hour and a few centimetres per hour, depending on the maximum temperature of the substrate, sample and the nature thereof.

The thermal decomposition or "cracking" gases escape from the substrate, for example via the pores not yet blocked.

The gases from the reaction are removed into the upper portion of the reactor.

The substrate is subsequently cooled.

The method according to the invention finds its application notably in the aeronautics, space and automotive sectors.

EXAMPLES

The invention will now be described with reference to the following examples, given for illustrative and non-limiting purposes.

In said examples, the method according to the invention is implemented using a calefaction densification device.

Thus, in order to produce oxide deposits by calefaction, a calefaction densification device otherwise known as a "Kalamazoo" device on the laboratory scale was developed.

Said device is substantially similar to the device shown in FIG. 1.

Said device comprises a reactor 1 consisting of a chamber 3 made of borosilicate, and may receive 200 mL of liquid calefaction precursor 16.

A brass sample holder 5, also forming electrodes, makes it possible to hang the structure or part 4 that supports the substrate (i.e. the reinforcements) on which the oxide deposit is performed.

The structure or part 4 that supports the substrate on which the oxide deposit is performed, must imperatively be made of an electrically-conductive material, such as carbon graphite, said part, notably made of carbon graphite, is called support or susceptor.

The sample holder 5 is directly connected to a power supply 6, for example a power supply named Power Supply EA PSI 9080-100, by means of wires 7.

The "Kalamazoo" reactor 1 is designed in order to be used with resistive heating. Therefore, it is by Joule effect that the support 4 is heated, from 25° C. to more than 1400° C. according to the power supplied to the system.

The temperature of said support cannot be accurately monitored using thermocouples.

A pyrometer 8, for example an Ircon Modline® pyrometer 3, is therefore used in order to accurately know the temperature of the heated support (indeed the support and the substrate have substantially the same temperature). This is an infrared thermometer that detects without contact the rays 10 emanating from the heat source, here the support 4 and the substrate.

The support 4 reaches very high temperatures which locally causes the vaporisation and the cracking of the precursor.

The reactor 1 is equipped with a Graham condenser 2 wherein ethylene glycol circulates, between an input of ethylene glycol 14 generally at 0° C. and an output of ethylene glycol 15. Said Graham condenser 2 is used in order to limit the losses of the precursor only to the cracking gases which are not condensable at 0° C.

It should be noted that it is also possible to use a reactor with induction heating as described in documents [1], [2], or [3].

In the following examples, which illustrate the method according to the invention (Examples 3 to 7), three substrates, were mainly used, said substrates are disposed, placed on the support and constitute the reinforcements of the matrix of the composite material prepared by the method according to the invention.

Given that the "Kalamazoo" reactor operates resistively, it is essential to use as base for the support a carbon graphite bar.

In order to prepare the substrates used in the examples that illustrate the method according to the invention, on the support consisting of a carbon graphite bar are placed, disposed, different fibres or fabric of fibres, which will then play the role of fibrous reinforcement in the composite material prepared by the method according to the invention.

More precisely, the fibres or the fabric of fibres are wound on the carbon graphite bar.

The three substrates used in the following examples that illustrate the method according to the invention were prepared by placing, disposing on the carbon bar used as support, more precisely by winding around the carbon graphite bar respectively:
- a thread consisting of Nextel® 610 fibres. These are fibres available from the company 3M° of 10 to 12 µm in diameter consisting at 99% of alumina;
- a thread consisting of Nextel® 440 fibres. These are fibres available from the company 3M® of 8 µm in diameter consisting at 98% of mullite (2% boron). Mullite is a crystalline solid, defined compound of formula $(3Al_2O_3, 2SiO_2)$. Said fibres are thermal and electrical insulators and cannot be heated via Joule effect but only by thermal conduction, by direct contact with the carbon graphite bar;
- a fabric of Nextel® 440 fibres.

By the method according to the invention implemented with the reactor described above, said substrates made of oxide fibres can be densified by calefaction forming an oxide matrix and therefore oxide/oxide materials can thus be produced.

In the following examples 1 and 2, silica and alumina are deposited on a single carbon bar used as support and that plays here also the role of deposition substrate.

The conditions of the experiments carried out in Examples 1 and 2 are described in Table II, below:

TABLE II

| Example | Substrate | Temperature of the substrate | Duration |
|---|---|---|---|
| 1 | Carbon graphite bar | 900° C. | 63 minutes |
| 2 | Carbon graphite bar | 900° C. | 28 minutes |

EXAMPLE 1

In this example, a carbon graphite bar of a diameter of 3 mm and of a height of 7 cm is used as support, and also as substrate, susceptor.

The bar, immersed in 200 mL of liquid precursor, is heated to 900° C. for 63 minutes.

The voltage used is 6.98 V and the intensity is 58.4 A, i.e. a power output of 407.6 W.

The liquid precursor used is tetraethyl orthosilicate (TEOS) (supplier Sigma Aldrich®, purity>99%) that forms silica by thermal decomposition.

The characterisation of the sample EO1 (900° C.-1 h) thus obtained is then carried out.

Figure 2:
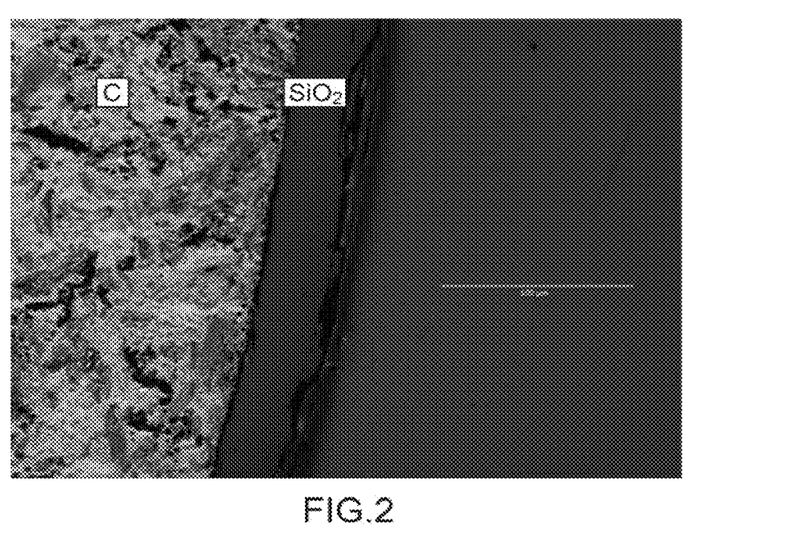
FIG. 2 is a photograph taken in optical microscopy, of a cross-section, perpendicular to the carbon graphite support, of the sample E01, prepared in Example 1.

FIG. 2 is a photograph taken in optical microscopy of a cross-section of the sample E01.

A deposit can be seen in the form of a coating of silica of a constant thickness, in the order of 40 µm.

The chemical characterisation of the deposit showing that this is silica is carried out by an electron probe microanalyser.

No crack is present on the layer deposited at 900° C. The thickness of the layer of $SiO_2$ deposited is homogeneous over the entire surface of the carbon bar.

EXAMPLE 2

In this example, a carbon graphite bar of a diameter of 3 mm and of a height of 7 cm is used as support and as substrate, susceptor.

The bar, immersed in 200 mL of liquid precursor, is heated at 900° C. for 28 minutes.

The voltage used is 8.64 V and the intensity is 65 A, i.e. a power output of 561.2 W.

In this example, the calefaction is performed with a precursor other than in Example 1, i.e. with aluminium tri-sec butoxide (supplier Sigma Aldrich, purity 97%) in the aim of forming alumina by means of thermal decomposition.

The characterisation of the sample EO2 (900° C.-28 min) thus obtained is then carried out.

Figure 3:
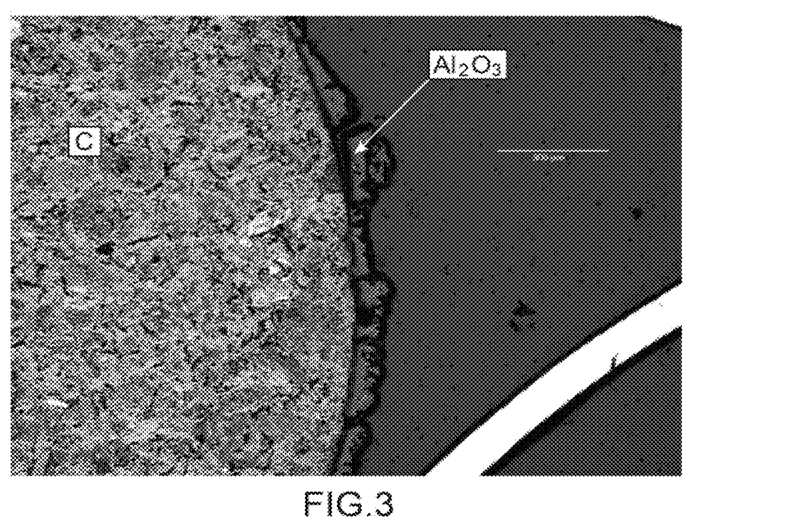
FIG. 3 is a photograph taken in optical microscopy, of a cross-section, perpendicular to the carbon graphite support, of the sample E02, prepared in Example 2.

FIG. 3 is a photograph taken in optical microscopy of the sample E02.

Figure 4:
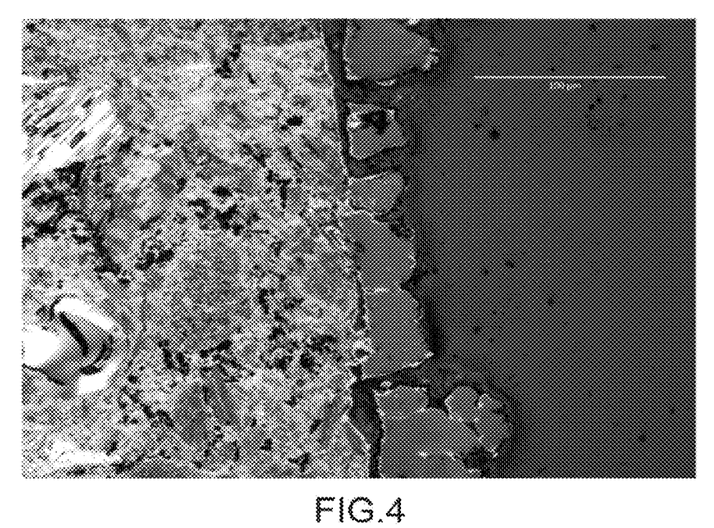
FIG. 4 is a photograph taken in optical microscopy, at a higher magnification, of a cross-section, perpendicular to the carbon graphite support, of the sample E02, prepared in Example 2.

FIG. 4 is also a photograph taken in optical microscopy of the sample E02, but at a higher magnification.

It can be seen on said images, that a deposit in the form of an alumina coating was produced at 900° C.

Said deposit is very friable, very thin, of a thickness of 40 µm, and is very cracked when it is compared with the silica deposit obtained by decomposition of TEOS in Example 1.

An analysis by electron probe microanalyser was carried out and confirmed that the deposit obtained has the atomic composition $Al_2O_3$.

In the following examples 3 to 7, silica is deposited on a substrate of oxide fibres or of a fabric of oxide fibres, said substrate being disposed, more precisely wound on a support consisting of a carbon graphite bar.

The conditions of the experiments carried out in Examples 3 to 7 are described in Table III, below:

TABLE III

| Example | Support + substrate | Temperature of the substrate | Duration |
|---|---|---|---|
| 3 | Carbon bar + Nextel ® 610 alumina fibres | 900° C. | 28 minutes |
| 4 | Carbon bar + Nextel ® 440 mullite fibres | 815° C. | 28 minutes |
| 5 | Carbon bar + Nextel ® 440 mullite fibres | 857° C. | 28 minutes |
| 6 | Carbon bar + Nextel ® 440 mullite fabric | 881° C. | 28 minutes |
| 7 | Carbon bar + Nextel ® 440 mullite fibres | 1000° C. | 60 minutes |

EXAMPLE 3

In this example, a $SiO_2/Al_2O_3$ composite composite material is prepared, more precisely a composite material with a $SiO_2$ matrix reinforced by alumina fibres, by the method according to the invention.

A carbon bar of a diameter of 3 mm and of a height of 7 cm is used as support. Threads consisting of alumina fibres (Nextel® 610 alumina fibres, of a diameter of approximately 10 µm) are wound around said support.

The bar, immersed in 200 mL of liquid precursor, is heated at 900° C. for 28 minutes.

The voltage used is 8.64 V and the intensity is 65 A, i.e. a power output of 561.6 W.

The liquid precursor used is tetraethyl orthosilicate (TEOS) that forms silica by thermal decomposition.

The characterisation of the sample E03 (900° C.-28 min) thus obtained is then carried out.

Figure 5:
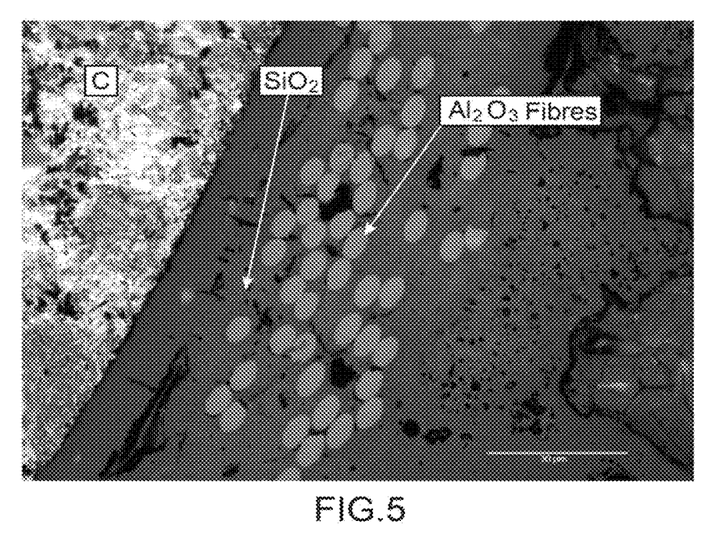
FIG. 5 is a photograph taken in optical microscopy, of a cross-section, perpendicular to the carbon graphite support, of the sample E03, prepared in Example 3.

FIG. 5 is a photograph taken in optical microscopy of the sample E03.

Said image illustrates first of all the fact that the alumina fibres do not thermally insulate the graphite susceptor. Therefore, the phenomenon of densification by calefaction is performed even if a thermal insulator is wound around the graphite bar and separates the hot surface from the liquid precursor.

Next, as regards the microstructure, it can be seen that the silica forms a dense matrix around the alumina fibres.

The silica coating around the alumina fibres shows that the method of densification by calefaction is applied to the development of oxide/oxide composites.

EXAMPLE 4

In this example, a $SiO_2$/mullite composite material, more precisely a composite material with a $SiO_2$ matrix reinforced by mullite fibres, is prepared by the method according to the invention.

A carbon bar of a diameter of 3 mm and of a height of 7 cm is used as susceptor. Threads consisting of mullite fibres (Nextel® 440 mullite fibres, of a diameter of 8 µm) are wound around said susceptor.

The bar, immersed in 200 mL of liquid precursor, is heated at 815° C. for 28 minutes.

The voltage used is 6.74 V and the intensity is 64.3 A, i.e. a power output of 433 W.

The liquid precursor used is tetraethyl orthosilicate (TEOS) that forms silica by thermal decomposition.

The characterisation of the sample E04 (815° C.-28 min) thus obtained is then carried out.

Figure 6:
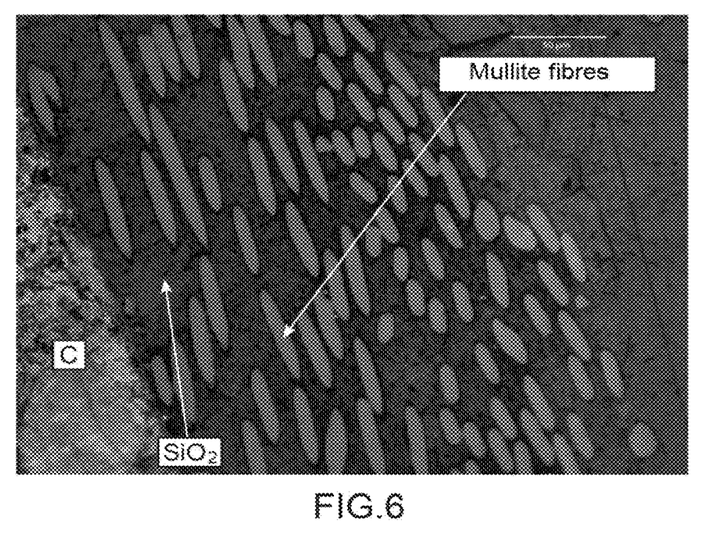
FIG. 6 is a photograph taken in optical microscopy, of a cross-section, perpendicular to the carbon graphite support, of the sample E04, prepared in Example 4.

FIG. 6 is a photograph taken in optical microscopy of the sample E04.

Said image shows that, even at a low temperature of the substrate (815° C.), TEOS can be used in order to create a silica matrix between oxide fibres.

Figure 7:
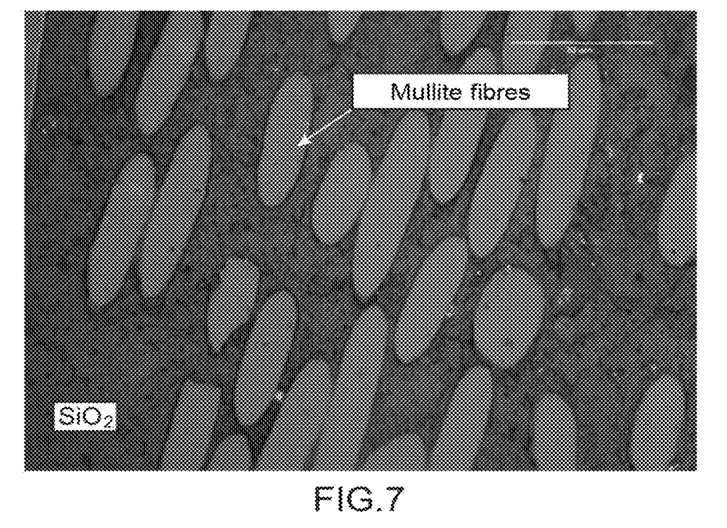
FIG. 7 is a photograph taken in optical microscopy, at a higher magnification, of a cross-section, perpendicular to the carbon graphite support, of the sample E04, prepared in Example 4.

FIG. 7 is also a photograph taken in optical microscopy of the sample E04, but at a higher magnification.

In said sample, prepared at a low temperature of the substrate, it is possible to note that the silica matrix is perfectly infiltrated into the fibrous mullite structure, and that it is dense, homogeneous and free of cracks. It can also be seen that the matrix does not contain carbon. The matrix surrounding the mullite fibres is entirely constituted of non-cracked silica.

EXAMPLE 5

In this example, a $SiO_2$/mullite composite material, more precisely a composite material with a $SiO_2$ matrix reinforced by mullite fibres, is prepared by the method according to the invention.

A carbon bar of a diameter of 3 mm and of a height of 7 cm is used as support. Threads consisting of mullite fibres (Nextel® 440 mullite fibres, of a diameter of 8 µm) are wound around said support.

The bar, immersed in 200 mL of liquid precursor, is heated at 857° C. for 28 minutes.

The voltage used is 7.25 V and the intensity is 66.9 A, i.e. a power output of 485 W.

The liquid precursor used is tetraethyl orthosilicate (TEOS) that forms silica by thermal decomposition.

The characterisation of the sample E05 (857° C.-28 min) thus obtained is then carried out.

Figure 8:
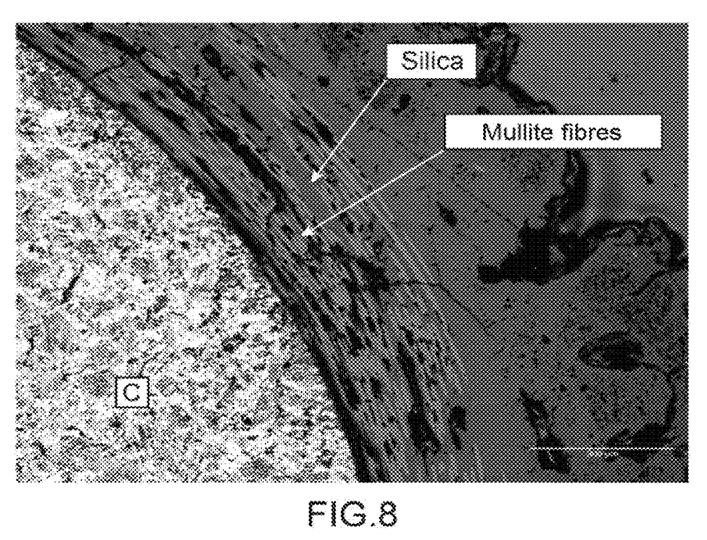
FIG. 8 is a photograph taken in optical microscopy, of a cross-section, perpendicular to the carbon graphite support, of the sample E05, prepared in Example 5.

FIG. 8 is a photograph taken in optical microscopy of the sample E05.

Said image shows that, when a temperature of the substrate, i.e. 857° C., greater than the temperature used for preparing the preceding sample E04 in Example 4, is used, the prepared sample E05, has a matrix that is more cracked than the matrix of Example E04 with wide pores.

Figure 9:
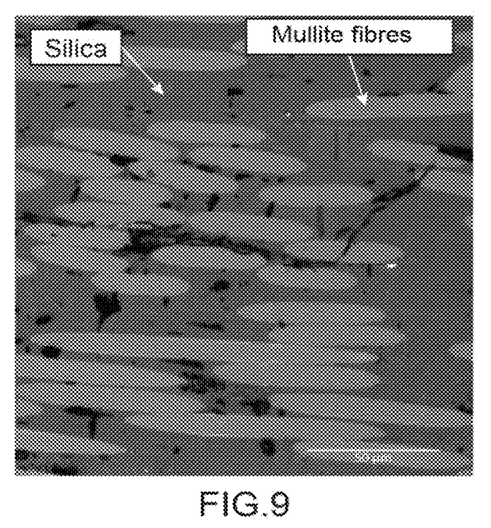
FIG. 9 is a photograph taken in optical microscopy, at a higher magnification, of a cross-section, perpendicular to the carbon graphite support, of the sample E05, prepared in Example 5.

FIG. 9 is also a photograph taken in optical microscopy of the sample E05, but at a higher magnification.

Said image shows that, within the mullite fibres, the formed silica, dense, has a few cracks and a few small pores but no carbon. Therefore, the deposit obtained is exclusively constituted of $SiO_2$.

EXAMPLE 6

In this example, a $SiO_2$/mullite composite material, more precisely a composite material with a $SiO_2$ matrix reinforced by mullite fibres, is prepared by the method according to the invention.

A carbon bar of a diameter of 3 mm and of a height of 7 cm is used as support. Threads consisting of mullite fibres (Nextel® 440 mullite fibres, of a diameter of 8 µm) are wound around said support.

The bar, immersed in 200 mL of liquid precursor, is heated at 881° C. for 28 minutes.

The voltage used is 7.80 V and the intensity is 65.7 A, i.e. a power output of 512 W.

The liquid precursor used is tetraethyl orthosilicate (TEOS) that forms silica by thermal decomposition.

The characterisation of the sample E06 (881° C.-28 min) thus obtained is then carried out.

Figure 10:
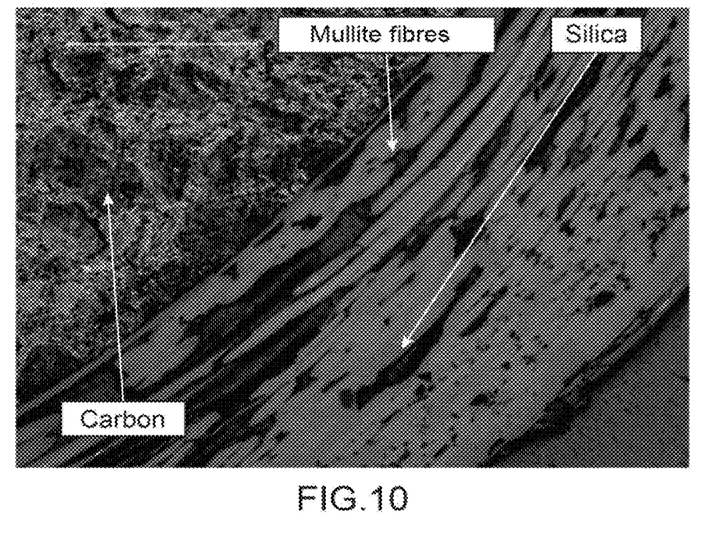
FIG. 10 is a photograph taken in optical microscopy, of a cross-section, perpendicular to the carbon graphite support, of the sample E06, prepared in Example 6.

FIG. 10 is a photograph taken in optical microscopy of the sample E06.

Said image shows that, when a temperature of the substrate of 881° C. is used, the fibres are coated with a non-cracked silica matrix that has wide pores.

Figure 11:
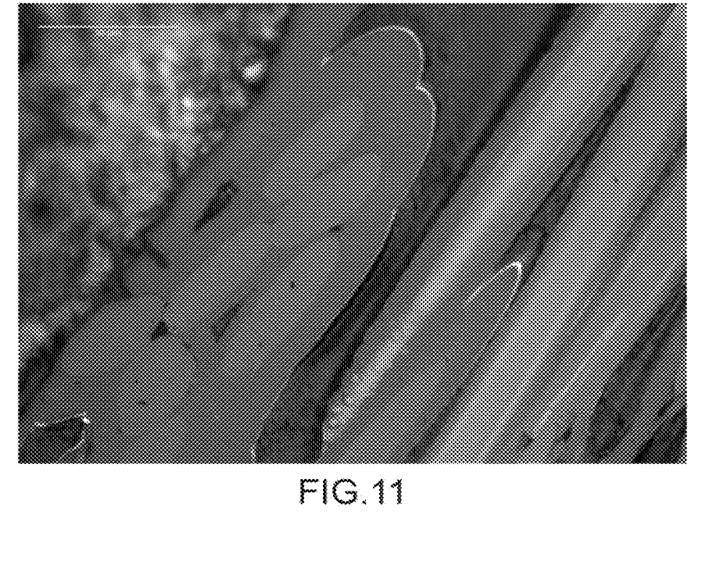
FIG. 11 is a photograph taken in optical microscopy, at a higher magnification, of a cross-section, perpendicular to the carbon graphite support, of the sample E06, prepared in Example 6.

FIG. 11 is also a photograph taken in optical microscopy of the sample E06, but at a higher magnification.

At higher magnification, it can be seen that the silica is infiltrated properly into the intra-fibre area. There is no decohesion between the fibres and the matrix, but if wide pores are present, they are not easily filled by the matrix. In addition, at the extreme limit of the silica deposit, it is possible to see a clearer, very fine, area that corresponds to a carbon deposit of thickness 27 nm. This means that when a temperature of the substrate of 881° C. is used, which is higher than the temperature of the substrate used in the preceding examples, for an identical heating time, carbon may be formed. Said carbon comes from the maturing of the precursor, which is more rapid when the temperature is higher.

EXAMPLE 7

In this example, a $SiO_2$/mullite composite material, more precisely a composite material with a $SiO_2$ matrix reinforced by a fabric of mullite fibres, is prepared by the method according to the invention.

A carbon bar of a diameter of 3 mm and of a height of 7 cm is used as support. A mullite fibre fabric (Nextel® 440 mullite fibres, of a diameter of 8 μm) is wound around said support in order to experiment the calefaction of oxides on a substrate including a large number of fibres.

The bar, immersed in 200 mL of liquid precursor, is heated at 1000° C. for 60 minutes (1 hour).

The voltage used is 7.62 V and the intensity is 76.2 A, i.e. a power output of 580 W.

The liquid precursor used is tetraethyl orthosilicate (TEOS) that forms silica by thermal decomposition.

The characterisation of the sample E07 (1000° C.-1 h) thus obtained is then carried out.

Figure 12:
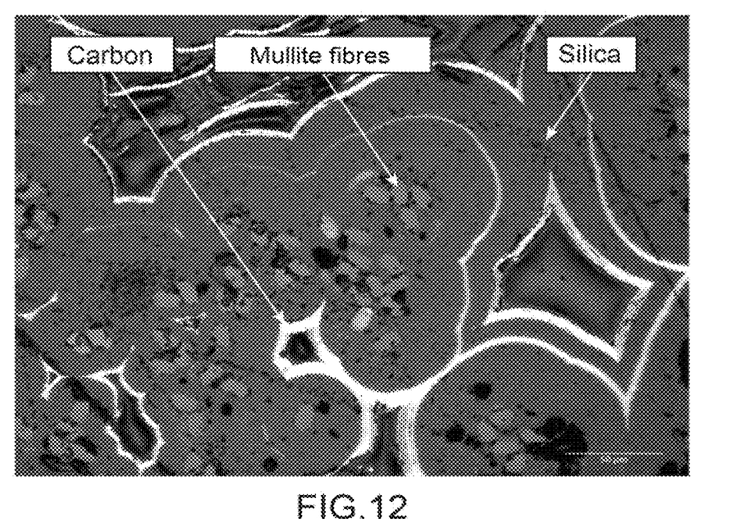
FIG. 12 is a photograph taken in optical microscopy, of a cross-section, perpendicular to the carbon graphite support, of the sample E07, prepared in Example 7.

FIG. 12 is a photograph taken in optical microscopy of the sample E07.

Figure 13:
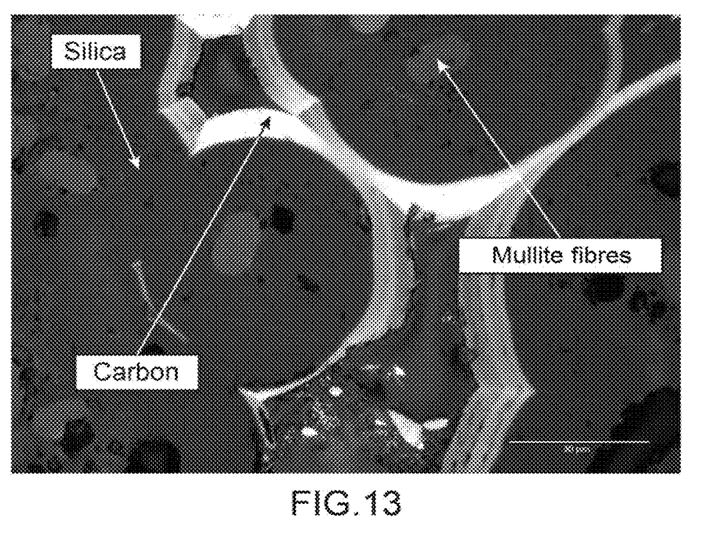
FIG. 13 is a photograph taken in optical microscopy, at a higher magnification, of a cross-section, perpendicular to the carbon graphite support, of the sample E07, prepared in Example 7.

FIG. 13 is also a photograph taken in optical microscopy of the sample E07, but at a higher magnification.

The experiment carried out in this example was carried out at a high temperature, i.e. 1000° C., for a substantial time, i.e. 1 h.

It is possible to note on the images of FIGS. 13 and 14 that the silica matrix has properly infiltrated the fibres. However, said matrix has two types of porosity, that is to say a small-size porosity close to the fibres, and a large-size porosity as soon as there are no more fibres in the areas of large macropores. There is no cracking at the interface between the fibres and the matrix. The presence of a thick and shiny border of carbon can be seen within the silica matrix around the periphery of the wide pores. Said carbon is due to the excessive maturing of the TEOS precursor and to the decomposition of the by-products thereof such as ethanol and the other carboneous molecules. The entire fabric was densified by the silica over a thickness estimated at 3 mm. Thus, it is possible to make thick composites in the order of a few mm by the method according to the invention.

Conclusions of the Examples

The examples presented above provide the proof that oxide/oxide composite materials with silica and alumina matrices can be prepared by the method according to the invention.

However, the man skilled in the art will understand that the method according to the invention may also be used to prepare composite materials with matrices consisting of any other oxide such as for example, zirconia or titanium oxide.

The man skilled in the art will indeed easily know how to determine the suitable precursor for forming the oxide chosen to constitute the matrix.

In the same manner, the examples presented above provide the proof that oxide/oxide composite materials with reinforcements that are mullite or alumina fibres can be prepared by the method according to the invention.

However, the man skilled in the art will understand that the method according to the invention may also be used to prepare composite materials with reinforcements consisting of silica fibres or any oxide fibre.

Similarly, the reinforcements may be in any form for example, in the form of threads, fabrics or felts or even of three-dimensional structures with long fibres.

The resistive heating reactor used in the examples may only be used to densify substrates that can be heated by Joule effect. Therefore, densifying fibres made of oxides is generally only possible for a low thickness of substrate, in the order of a few millimetres (see Example 7).

The use of induction heating makes it possible to directly heat substrates made of oxides to be densified by freeing of the carbon susceptor and of the cylinder shape of the structure.

REFERENCES

[1] HOUDAYER M., et al., "*Procédé de densification d'une structure poreuse*": EP-A1-0 081 409.
[2] CONNORS D. F. Jr., "*Partially densified carbon preform*": WO-A1-99/40043.
[3] DAVID P., et al., "*Procédé de densification d'une structure poreuse par du nitrure de bore et structure poreuse densifiée par du nitrure de bore*": FR-A1-2 712 884.

The invention claimed is:

1. A method for preparing, by a film-boiling chemical vapour infiltration (CVI) technique, a composite material consisting of a matrix of at least one first oxide of at least one metal and/or at least one metalloid reinforced by reinforcements comprising at least one second oxide of at least one metal and/or at least one metalloid, the method consisting of, in the following order:
   disposing the reinforcements in at least one liquid precursor compound of the first oxide of at least one metal and/or at least one metalloid; and
   heating said reinforcements and the liquid precursor compound, forming a vapour barrier of the liquid precursor compound on the surface of the reinforcements, so as to form the first oxide by thermal decomposition of said liquid precursor compound, and to deposit the first oxide thus formed around the reinforcements and between the reinforcements thus forming the matrix.

2. The method according to claim 1, wherein the first oxide of at least one metal and/or at least one metalloid is selected from the group consisting of $SiO_2$, $Al_2O_3$, $ZrO_2$, $TiO_2$, mullite, aluminosilicates, and mixtures thereof.

3. The method according to claim 1, wherein the second oxide of at least one metal and/or at least one metalloid is selected from the group consisting of silica, alumina, mullite, and mixtures thereof.

4. The method according to claim 1, wherein the reinforcements are fibres.

5. The method according to claim 4, wherein the fibres form threads, fabrics, felts or three-dimensional structures with fibres with a length dimension.

6. The method according to claim 1, wherein the liquid precursor compound has a boiling temperature of less than 300° C.

7. The method according to claim 1, wherein the liquid precursor compound is chosen from all the liquid precursor compounds used in the chemical vapour deposition (CVD) technique or in the sol-gel technique.

8. The method according to claim 1, wherein the liquid precursor compound is chosen from the organometallic compounds and the organometalloid compounds.

9. The method according to claim 8, wherein the organometallic compounds are chosen from the alkoxides/alcoholates of metals, and the organometalloid compounds are chosen from the alkoxides/alcoholates of metalloids.

10. The method according to claim 8, wherein the organometallic compounds are chosen from the organometallic compounds comprising at least one metal selected from the group consisting of zirconium, aluminium, titanium, cerium, yttrium, lanthanum, lead, tin, antimony, boron, vanadium, indium, niobium, bismuth and hafnium.

11. The method according to claim 8, wherein the organometallic compounds are at least one selected from the group consisting of trialkoxy aluminiums; aluminium acetylacetonate; tetra alkoxy zirconiums; and tetra alkoxy titaniums.

12. The method according to claim 8, wherein the organometalloid compounds are chosen from organosilanes.

13. The method according to claim 12, wherein the organometalloid compounds are selected from the group consisting of tetra alkoxy silanes, methyltrichlorosilane (MTS), dimethyldichlorosilane, and methyl dichlorosilane.

14. The method according to claim 1, wherein the reinforcements and the liquid precursor compound are heated at a temperature of 700° C. to 120° C., for a period of 5 to 120 minutes.

15. The method according to claim 1, wherein the reinforcements and the liquid precursor compound are heated by inductive heating or resistive heating.

* * * * *